US006507849B1

(12) United States Patent
Choudhary

(10) Patent No.: US 6,507,849 B1
(45) Date of Patent: Jan. 14, 2003

(54) METHODS AND APPARATUS FOR ACCESSING A DATA STORAGE SYSTEM

(75) Inventor: Jagjit Singh Choudhary, Karnataka (IN)

(73) Assignee: Cisco Techno-ogy, Inc., San Jose, CA (US)

( * ) Notice: Subject to any disclaimer, the term of this patent is extended or adjusted under 35 U.S.C. 154(b) by 0 days.

(21) Appl. No.: 09/525,982

(22) Filed: Mar. 15, 2000

(51) Int. Cl.⁷ .............................................. G06F 17/30
(52) U.S. Cl. .................................... 707/103 Y; 707/10
(58) Field of Search ................................... 707/10, 103

(56) References Cited

U.S. PATENT DOCUMENTS

| | | | | |
|---|---|---|---|---|
| 5,758,153 A | * | 5/1998 | Atsatt et al. | 707/103 |
| 6,105,131 A | | 8/2000 | Carroll | 713/155 |
| 6,189,000 B1 | | 2/2001 | Gwertzman et al. | 707/1 |
| 6,208,986 B1 | * | 3/2001 | Schneck et al. | 707/3 |
| 6,230,190 B1 | | 5/2001 | Edmonds et al. | 709/213 |
| 6,260,039 B1 | * | 7/2001 | Schneck et al. | 707/10 |
| 6,389,589 B1 | * | 3/2002 | Mishra et al. | 717/11 |

OTHER PUBLICATIONS

Jagadish et al., "Querying Network Directories," Int'l Conf. on Mgmt of Data Symposium on Principles of Database Systems, pp. 133–144, 1999.*

Cluet et al., "Using LDAP Directory Caches," Int'l Conf. on Mgmt of Data Symposium on Principles of Database Systems, pp. 273–284, 1999.*

* cited by examiner

Primary Examiner—Charles L. Rones
(74) Attorney, Agent, or Firm—Chapin & Huang, L.L.C.; David E. Huang, Esq.

(57) ABSTRACT

The invention is directed to techniques for accessing a data storage system having both a filesystem and directory system. In one arrangement, an apparatus has memory that stores an application, and a controller coupled to the memory. The controller operates in accordance with the application stored in the memory to access a data storage system. In particular, the application configures the controller to obtain an access instruction which identifies a portion of the data storage system, and determine, in response to the obtained access instruction, whether the identified portion of the data storage system is a file of the filesystem or a directory entry of the directory system. The application further configures the controller to perform a file access operation to access the identified portion as a file when the identified portion is determined to be a file of the filesystem, and a directory entry access operation to access the identified portion as a directory entry when the identified portion is determined to be a directory entry of the directory system. Since the apparatus is capable of determining whether the access instruction identifies a file of a filesystem or a directory entry of a directory system, application developers need not be concerned about the availability of any particular vendor-specific APIs. Rather, the application developers can simply use an access instruction with a common syntax and expression such as that for accessing a file of UNIX filesystem (e.g., open( ), read( ), write( ), etc.), and let the apparatus determine how to handle such instructions.

24 Claims, 12 Drawing Sheets

METHODS AND APPARATUS FOR ACCESSING A DATA STORAGE SYSTEM

BACKGROUND OF THE INVENTION

Some application developers develop applications which perform data storage and retrieval operations. To this end, an application developer typically writes application source code which includes data storage and/or retrieval commands using a programming language (e.g., the C programming language). In general, the application developer builds an executable application from the application source code (e.g., by compiling and linking the application source code). This executable application contains instructions that run on a computer system to store data within and/or retrieve data from memory of the computer system.

By way of example, FIG. 1 shows a computer system 20 which includes a first computer 22-A, a second computer 22-B, and a network connection 24 allowing communication between the first and second computers 22-A, 22-B. Each of the first and second computers 22-A, 22-B includes a filesystem. In particular, the first computer 22-A includes a UNIX filesystem 26-A. Similarly, the second computer 22-B includes a UNIX filesystem 26-B. As shown in FIG. 1, each of the UNIX filesystems 26-A, 26-B includes files which are logically organized in an inverted tree configuration.

The second computer 22-B further includes a directory system. In particular, as shown in FIG. 1, the second computer 22-B has a Lightweight Directory Access Protocol (LDAP) directory system 28-B and operates as an LDAP server. The LDAP directory system 28-B includes directory entries which are organized in an inverted tree configuration which is similar to that of the UNIX filesystems 26-A, 26-B. Directory systems are similar to databases in that they operate as repositories, or storage facilities, for information. However, in contrast to databases, directory systems tend to contain more descriptive, attribute-based information (e.g., names, addresses, job titles, etc.). Furthermore, information is generally more often read from such directory systems than written to such directory systems.

FIG. 2A shows application code 30 having commands for accessing the filesystem 26-A of the first computer 22-A. In particular, the application code 30, when compiled and linked into an executable application, provides instructions for retrieving information 32 from a file 34 of the filesystem 26-A.

To create application code for accessing UNIX filesystems, application developers can use file access commands in the C programming language. In general, such commands have standardized names (e.g., "open( )", "write( )", "read( )", "getline( )", "close( )", etc.) and standardized expression formats (e.g., operation(arg1, . . . ,argN)).

Some application developers develop applications which conform to a programming standard called POSIX, which is an acronym for portable operating system interface for computer environments. By conforming application code to the POSIX programming standard, the application developer has some assurance that the application will be relatively easily portable to POSIX-compliant computer systems. Sun Microsystems, Inc. of Palo Alto, Calif., International Business Machines Corporation of Armonk, N.Y., and Hewlett-Packard of Palo Alto, Calif. are examples of computer manufacturers which provide POSIX-compliant computer systems.

It should be understood that there are other filesystems which can be used for storing and retrieving data. Examples of other filesystems include the MS-DOS filesystem and the Windows/NT filesystem, both of which are provided by Microsoft Corporation of Redmond, Wash.

Furthermore, it should be understood that some computer systems provide access to multiple types of filesystems. For example, some computer systems running the UNIX operating system can be configured to provide access to both a UNIX filesystem and a Windows/NT filesystem. In general, when applications run in such a computer system, the operating system handles application instructions (e.g., system calls) which request access to files of the different filesystems. Typically, when a running application reaches a file access instruction (e.g., open( )), the operating system figures out which type of filesystem the file access instruction is attempting to access (i.e., UNIX or Windows/NT in this example), and then performs one or more file access operations which are appropriate for accessing that type of filesystem.

FIG. 2B shows application code 40 having commands for accessing the LDAP directory system 28-B of the second computer 22-B (an LDAP server). In particular, the application code 40, when compiled and linked into an executable application, provides instructions for retrieving information 42 from an LDAP directory entry 44 of the LDAP directory system 28-B. Generally, the computer system 52-B operates as an LDAP server such that an executable application derived from the application code 40 can run on any of the computers 22 as an LDAP client communicating with the LDAP server.

To create application code for accessing directory systems, an application developer typically obtains a development environment package from a provider or manufacturer of a directory system product (hereinafter referred to as a vendor). Such a package typically includes a vendor-specific application programming interface (API) for developing an application, and a directory system server platform having a suite of services, utilities and tools for testing the application. In general, the application developer includes, in the application code, directory access commands (e.g., "ldap_search( )", "ldap_entry( )", "ldap_first_attribute( )", "ldap_next$_{13}$ attribute( )", etc.) which conform to the vendor-specific API. In the case of LDAP directory systems, such code typically relies on manipulating LDAP information such as directory entry locations, port numbers, etc.

Additionally, it is common for such commands to have unique, vendor-specific names and expressions. Examples of LDAP directory system vendors include the University of Michigan of Ann Arbor, Mich., Sun Microsystems, Inc. of Palo Alto, Calif., International Business Machines Corporation of Armonk, N.Y., and Netscape Communications Corporation of Mountain View, Calif. By way of example, the command for performing a bind function using ADSI, which is provided by Microsoft Corporation of Redmond, Wash., is similar to:

AdsOpenObject("LDAP://server/en=bols,o=company . . . ).

In contrast, the command for performing a bind function using NDS, which is provided by Novell of Orem, Utah, is similar to:

NWDSLogin(context,o,UserName,UserPassword,o).

Accordingly, LDAP expressions can vary greatly among vendors.

SUMMARY OF THE INVENTION

Applications which access directory systems using vendor-specific APIs are often hindered by unique aspects of such APIs. For example, it is common for LDAP vendors to require unique names and expressions for particular LDAP commands. That is, application developers must use these unique names and expressions in order to properly program an application to a particular LDAP vendor's API. Accordingly, the application developer of an application often relies on each customer having a particular LDAP server product also installed on computer systems running the application developer's application. Otherwise, it may be possible for the application to include one or more LDAP commands (e.g., ldap_open( ), ldap_create( ), ldap_read( ), etc.) or command expressions (e.g., Idap_open (arg1,arg2) vs. Idap_open(*argl,*arg2)) which the computer system cannot understand or handle.

In situations where the LDAP product of a particular LDAP vendor is unavailable but the LDAP product of another LDAP vendor is available, the application developer may be able to port the LDAP application such that it is able to use the other LDAP product. However, in some situations, applications are not easily portable and require significant code changes when switching between different vendor-specific APIs. Furthermore, if even only minor code changes are required, the porting process still requires recompiling and relinking of the application, and often thorough retesting. Moreover, such an endeavor often requires that the application developer provide future technical support for both the original application (which works with the original vendor-specific API) as well as any newly ported application (which works with the new vendor-specific API) in order to maintain goodwill, and the perception of quality and good service among customers.

In contrast to the above-identified approaches to accessing LDAP directory systems using different vendor-specific APIs, the invention is directed to techniques for accessing a data storage system having both a filesystem and directory system by determining, in response to an instruction for accessing a portion of the data storage system, whether the portion is a file of the filesystem or a directory entry of the directory system, and then accessing that portion of the data storage system appropriately. Accordingly, application developers can use commands with common or standard names and expressions, such as those for accessing files of filesystems (e.g., POSIX calls), and rely on the above-identified determination (e.g., performed by the operating system of a computer) for proper operation and processing of the application.

One arrangement of the invention is directed an apparatus having memory that stores an application, and a controller that is coupled to the memory. The controller operates in accordance with the application stored in the memory to access a data storage system. The data storage system includes a filesystem and a directory system. The application configures the controller to perform a method having the steps of: (a) obtaining an access instruction which identifies a portion of the data storage system, and (b) determining, in response to the obtained access instruction, whether the identified portion of the data storage system is a file of the filesystem or a directory entry of the directory system. The method further includes the step of: (c) performing a file access operation to access the identified portion as a file when the identified portion is determined to be a file of the filesystem, and a directory entry access operation to access the identified portion as a directory entry when the identified portion is determined to be a directory entry of the directory system.

Since the apparatus is capable of determining whether the access instruction identifies a file of a filesystem or a directory entry of a directory system, application developers need not be concerned about the availability of any particular vendor-specific APIs. Rather, the application developers can simply use an access instruction with a common syntax and expression such as that for accessing a file of filesystem (e.g., open( ), read( ), write( ), etc.), and let the apparatus (e.g., specialized hardware, a computer, etc.) determine how to handle such instructions.

In one arrangement, the filesystem is a UNIX filesystem, and the directory system is a Lightweight Directory Access Protocol directory system. In this arrangement, the step of performing includes the step of accessing the identified portion of the data storage system as (i) a UNIX file when the identified portion is determined to be a file of the filesystem, or (ii) a Lightweight Directory Access Protocol (LDAP) directory entry when the identified portion is determined to be a directory entry of the directory system.

In one arrangement, the method further includes, prior to the step of performing the access operation, the step of mounting a directory entry of the LDAP directory system to a mount point of the UNIX filesystem in order to couple the Lightweight Directory Access Protocol directory system to the UNIX filesystem. Preferably, the directory system mounts beneath the mount point of the filesystem. Such mounting couples the directory system to the filesystem. Accordingly, a user of the apparatus can then navigate among the directory system in a manner similar to that for navigating around a filesystem (e.g., using "cd" to change current directories when navigating within a UNIX filesystem).

In one arrangement, the step of determining includes the step of ascertaining a location of the identified portion of the data storage system relative to the mount point. of the UNIX filesystem. This allows enables the controller to determine whether the identified portion of the data storage system is a file of the filesystem or a directory entry of the directory system. For example, if the identified portion of the data storage system resides below the mount point in an inverse-hierarchical arrangement between the UNIX filesystem (which includes the root, "/") and the directory system, the identified portion is a directory entry of the directory system. However, if the identified portion is above the mount point, the identified portion is a file of the UNIX filesystem.

In an alternative arrangement, each file of the filesystem belongs to a file object class, and each directory entry of the directory system belongs to a directory entry object class. In this arrangement, the step of determining includes the step of deciding whether the identified portion belongs to the file object class or the directory entry object class. Accordingly, the controller can determine whether the identified portion is a UNIX file or LDAP directory entry.

In one arrangement, the access instruction is an open command, and the step of performing includes the step of carrying out, based on a result of the step of determining, one of a UNIX open operation and an LDAP open operation to open the identified portion of the data storage system.

In another arrangement, the access instruction is a create command, and the step of performing includes the step of carrying out, based on a result of the step of determining, one of a UNIX create operation and an LDAP create operation to create the identified portion of the data storage system.

In another arrangement, the access instruction is an unlink command, and the step of performing includes the step of carrying out, based on a result of the step of determining, one of a UNIX remove operation and an LDAP delete operation to erase the identified portion from the data storage system.

In another arrangement, the access instruction is a read command, and the step of performing includes the step of carrying out, based on a result of the step of determining, one of a UNIX read operation and an LDAP read operation to read data from the identified portion of the data storage system.

In another arrangement, the access instruction is a write command, and the step of performing includes the step of carrying out, based on a result of the step of determining, one of a UNIX write operation and an LDAP write operation to write data to the identified portion of the data storage system.

In another arrangement, the access instruction is a readdir command, and the step of performing includes the step of carrying out, based on a result of the step of determining, one of a UNIX readier operation and an LDAP readdir operation to obtain information regarding the identified portion of the data storage system (e.g., current location information when navigating around the data storage system).

Another arrangement of the invention is directed to a computer program product that includes a computer readable medium having instructions stored thereon for accessing a data storage system. The data storage system includes a filesystem and a directory system. The instructions, when carried out by the computer, cause the computer to perform the steps of: (a) obtaining an access instruction which identifies a portion of the data storage system; (b) determining, in response to the obtained access instruction, whether the identified portion of the data storage system is a file of the filesystem or a directory entry of the directory system; and (c) performing a file access operation to access the identified portion as a file when the identified portion is determined to be a file of the filesystem, and a directory entry access operation to access the identified portion as a directory entry when the identified portion is determined to be a directory entry of the directory system.

The directory system can be used as a repository for network information such as network configuration data and policy definitions. Application developers can then develop network applications which use an API having a file-like interface (i.e., file-like command names and expressions) to access the network information in entries of the directory system. In one arrangement, entries of the directory system are accessible using an interface of POSIX or POSIX-like names and expressions (e.g., open( ), read( ), write( ), etc.). Accordingly, in situations where the application developer knows a priori a location in the data storage system, an elaborate search filter is not required and the application developer can use familiar file-like system calls (e.g., open( ), read( ), write( ), etc.) to access the network information. The features of the invention, as described above, may be employed in data communications devices and other computerized devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

The invention is directed to techniques for accessing a data storage system having both a filesystem and directory system by determining, in response to an instruction for accessing a portion of the data storage system, whether the portion is a file of the filesystem or a directory entry of the directory system, and then accessing that portion of the data storage system appropriately. Accordingly, an application developer can develop an application having commands with common or standard names and expressions, such as those for accessing files of filesystems (e.g., using the same syntax as that for POSIX calls), and rely on this determination (e.g., performed by the operating system of a computer) for proper operation and processing of the application. Such an application will be more portable than applications which rely on vendor-specific APIs, e.g., Lightweight Directory Access Protocol (LDAP) APIs such as the LDAP C, ADSI and CNS/AD APIs. In particular, such an application can access directory entries using a file-like API (e.g., POSIX-like) and not worry about manipulating LDAP information such as directory entry locations, port numbers, etc.

Figure 1:
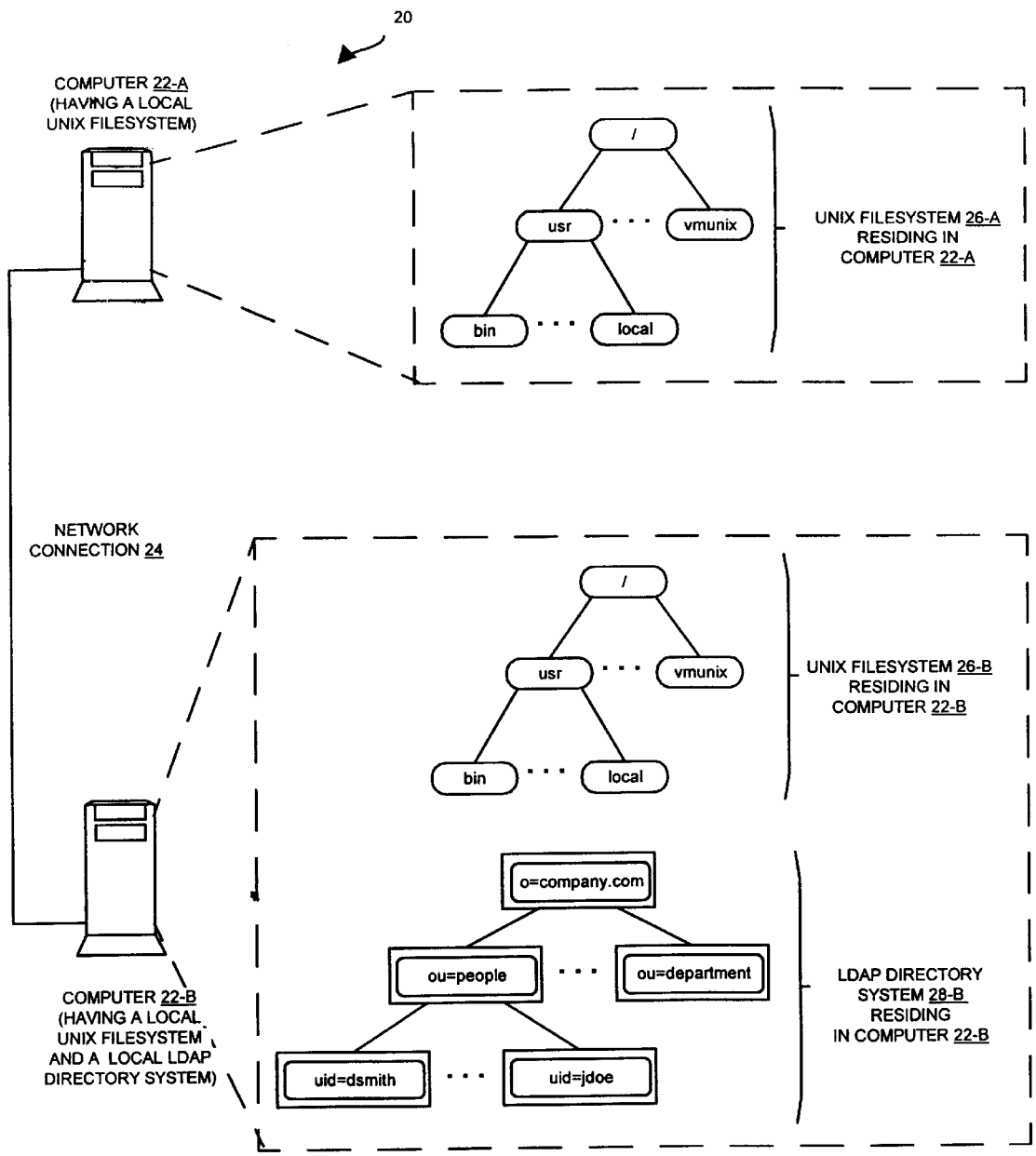
FIG. 1 (prior art) is a block diagram showing a conventional computer system having a first computer which stores a UNIX filesystem, and a second computer which stores a UNIX filesystem and a Lightweight Directory Access Protocol (LDAP) directory system.
Figure 2A:
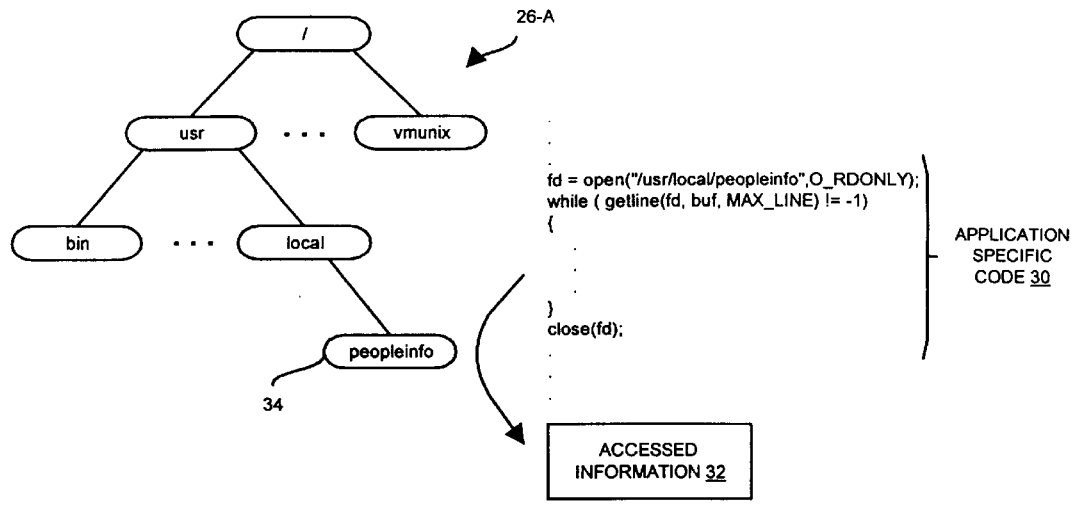
FIG. 2A (prior art) is a block diagram showing a conventional approach for accessing data from a file of one of the UNIX filesystems of FIG. 1.
Figure 2B:
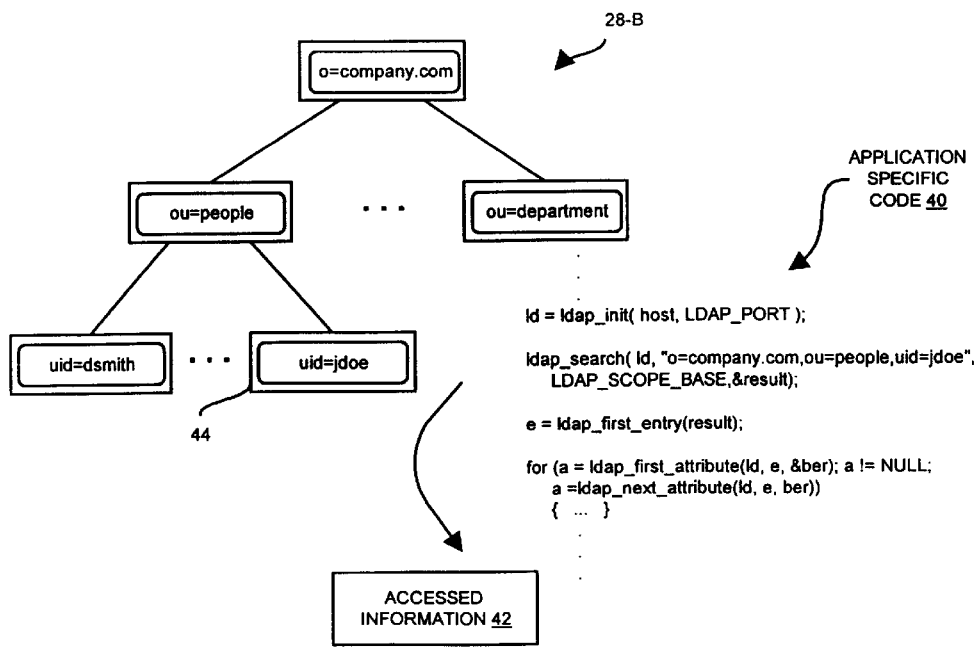
FIG. 2B (prior art) is a block diagram showing a conventional approach for accessing data from a directory entry of the LDAP directory system of FIG. 1.
Figure 3:
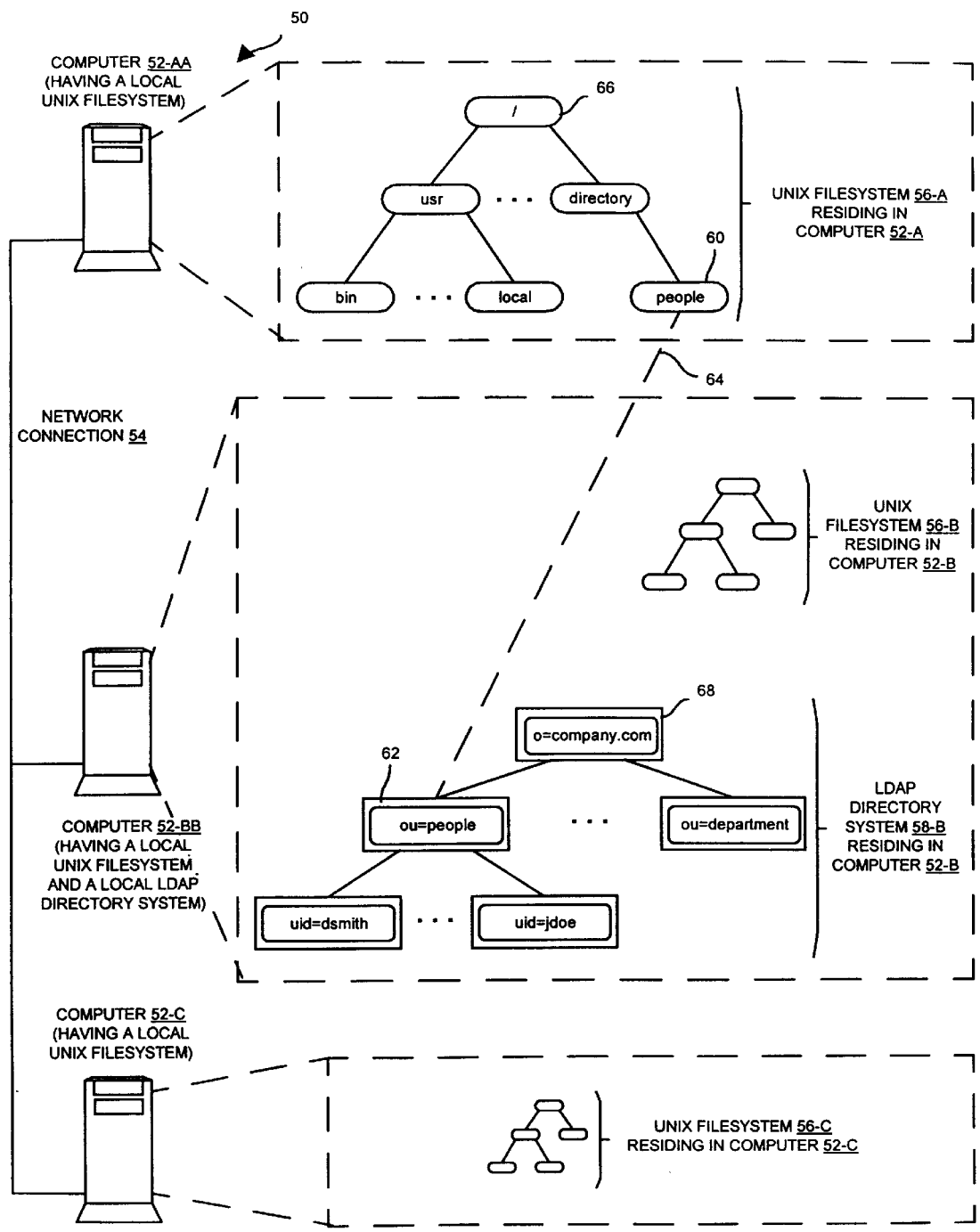
FIG. 3 is a block diagram showing a computer system which has a data storage system that includes a UNIX filesystem and a LDAP directory system which is suitable for use by the invention.

FIG. 3 shows a computer system 50 which is suitable for use by the invention. The computer system 50 includes a first computer 52-A, a second computer 52-B, a third computer 52-C, and a network connection 54 which enables the computers 52-A, 52-B, 52-C to communicate. The computers 52-A, 52-B, 52-C (collectively, the computers 52) include respective UNIX filesystems 56-A, 56-B, 56-C (collectively, the filesystems 56). The computer 52-B further includes an LDAP directory system 58-B.

As shown in FIG. 3, the UNIX filesystems 56 include files 60 which are organized logically into an inverted tree configuration. Similarly, the LDAP directory system 58-B includes directory entries 62 which are organized logically into an inverted tree configuration. An LDAP directory entry 62 of the LDAP directory system 58-B is logically coupled with a file 60, i.e., a mount point, of the UNIX filesystem 56-A, as illustrated in FIG. 3 by the dashed line 64, i.e., a mount relationship. This mount situation is similar to a network filesystem (NFS) mount in that a data storage system (namely, an LDAP directory system) of one computer (i.e., computer 52-B) is mounted to a mount point of another computer (i.e., computer 52-A) through the network connection 54.

In the arrangement of FIG. 3, any of the computers 52 can view and access the LDAP directory system 58-B. For example, the computer 52-B can view and access the LDAP directory system 58-B locally. Additionally, the computers 52-A and 52-C can view and access the LDAP directory system 58-B remotely. In particular, any of the computers 52 can view and access the LDAP directory system 58-B by navigating or traversing a data storage system 70 (FIG. 4) formed by the UNIX filesystem 52-A and the LDAP directory system 58-B. That is, the directory entries (or entries) of the directory system 58-B are visible below the mount point as files of the filesystem 52-A. Furthermore, in accordance with the invention, data within the directory entries are accessible using file-like system calls. Alternatively, applications can operate as LDAP clients and communicate with the computer 52-B as an LDAP server in a typical LDAP manner. Further details of these features of the invention will now be described with reference to FIGS. 4 and 5.

Figure 4:
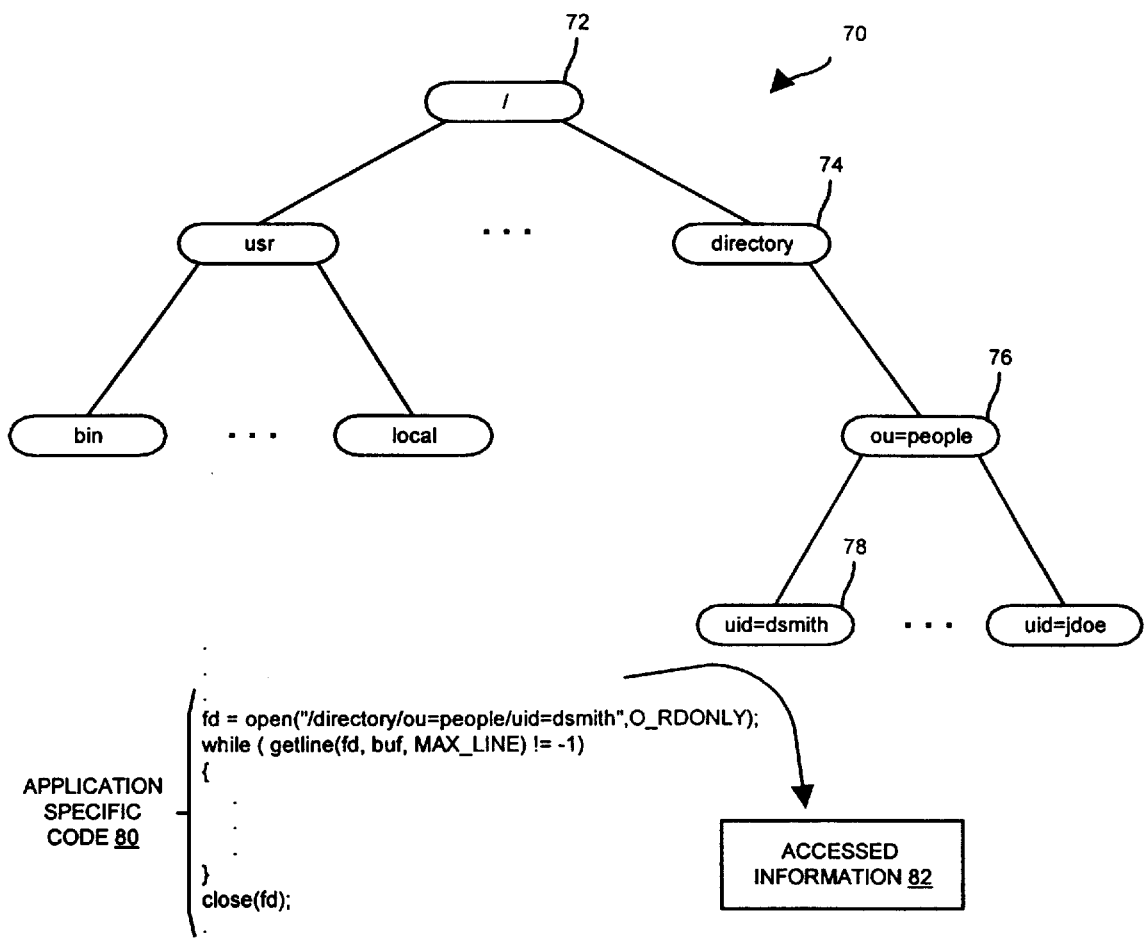
FIG. 4 is a block diagram showing a technique for accessing the data storage system of FIG. 3.

FIG. 4 shows a logical diagram of the data storage system 70 formed by the UNIX files system 56-A of the computer 52-A, and the LDAP directory system 58-B of the computer 52-B. In particular, the UNIX filesystem 56-A includes multiple files such as the root 72 (called "/") and a file 74 (called "directory"). The directory system 58-B includes multiple directory entries including an LDAP directory entry 76 (called "ou=people") and another LDAP directory entry 78 (called "uid=dsmith"). The LDAP directory entry 76 logically mounts to a mount point under the UNIX file 74 to maintain an inverted tree configuration for the data storage system 70.

Preferably, a user or an application can navigate around files and mounted LDAP directory entries of the data storage system 70 in a manner similar to that for navigating a filesystem. In the arrangement of FIG. 4, and by way of example only, a user can perform standard UNIX navigation operations such as listing child nodes beneath a current location (e.g., "ls") and changing from one current location to another (e.g., "cd". As another example, an application developer can develop application code 80 which includes common file access commands (e.g., "open( )") to access data within one or more LDAP directory entries. As shown in FIG. 4, application code 80, which uses commands having standard file access command names and expressions, can be compiled and linked to generate an executable application having instructions which access data 82 from an LDAP directory entry 78 based on those commands. Further details of this feature of the invention will now be provided with reference to FIG. 5.

Figure 5:
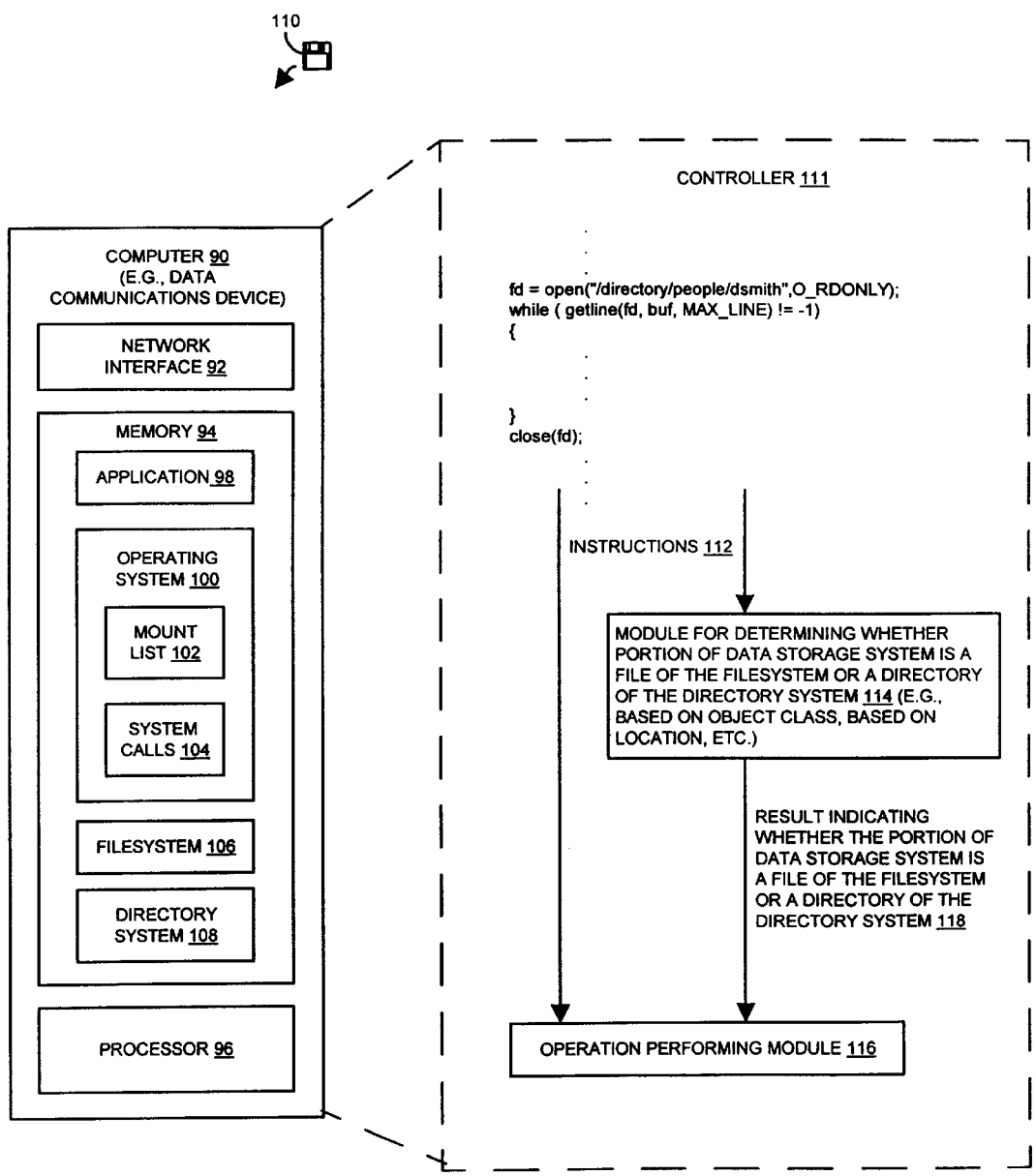
FIG. 5 is a block diagram showing a computer which is suitable for use as a computer of the computer system of FIG. 3.

FIG. 5 shows a computer 90 which is suitable for use as any of the computers 52 of the computer system 50 of FIG. 3. The computer 90 includes a network interface 92 (e.g., for interfacing with the network connection 54), memory 94 and a processor 96. The memory 94 consists of several memory constructs such as an application 98 and an operating system 100. The operating system 100 includes, among other things, a mount list 102 and an interface 104 (e.g., a system call interface).

The memory 94 may further include other memory constructs such as a filesystem 106 and a directory system 108. For example, each of the computers 52-A, 52-C includes a respective UNIX filesystem 56-A, 56-C, but does not include a directory system (see FIG. 3). Additionally, the computer 52-B (an LDAP server) includes both a UNIX filesystem 56-B and an LDAP directory system 58-B.

In one arrangement, a computer program product 110 (e.g., one or more CDROMs, tapes, diskettes, etc.) provides one or more of the above-described memory constructs to the computer 90. For example, the computer program product 110 may include both the application 98 and the operating system 100. In this example, the operating system 100 and the application 98 can be installed on the computer 90, and then invoked to create other memory constructs such as the directory system 108. The Cisco IOS manufactured by Cisco Systems of San Jose, Calif. is suitable for use as the operating system 100. As an alternative example, the computer 90 can acquire the application 98 through other means, e.g., via a network download through the network interface 92.

The operating system 100 supports a directory storage system 108 with object-classes (e.g., a directory entry object class) which enables the operating system 100 to treat directory entries of the directory system in a file-like manner. Furthermore, the directory entries, which are to be treated in the file-like manner by the operating system, include a "whole data" attribute. As such, when the operating system 100 accesses a portion of a data storage system having both files and directory entries and determines that the portion is a directory entry, the operating system 100 can provide information from the directory entry in LDAP Data Interchange Format (LDIF), a popular format that describes directory entry information as text files. However, if the directory entry has a different object class (e.g., a file object class), the controller 111 can provide the information in a different, non-LDIF format (e.g., store a file in the directory entry). This mechanism of storing files in a directory system can be made into a standard through the Internet Engineering Task Force (IETF) LDAP extension group.

During operation, the processor 96 runs the operating system 100 to form a controller 111 which processes instructions 112 (e.g., application instructions, command line user instructions, etc.). The controller 112 includes a determining module 114 and an operation performing module 116. The determining module 114 determines, for each data access instruction (e.g., open( ), read( ), write( ), etc.) of the instructions 112, whether that data access instruction targets a file of a filesystem (e.g., files 72, 74 in FIG. 4) or a directory entry of a directory system (e.g., directory entries 76, 78 in FIG. 4). The determining module 114 then provides a signal 118 to the operation performing module 116 indicating whether that data access instruction targets such a file or a directory entry. The operation performing module 116 executes the instructions 112. In particular, when the operation performing module 116 executes the data access instructions, the module 116 performs data access operations based on the signal 118 which indicates whether the data access instructions target files or directory entries. Accordingly, application developers can develop applications (e.g., the application 98) which use a file-like interface to access information (e.g., network information) within a directory system (e.g., the directory system 108).

Figure 6:
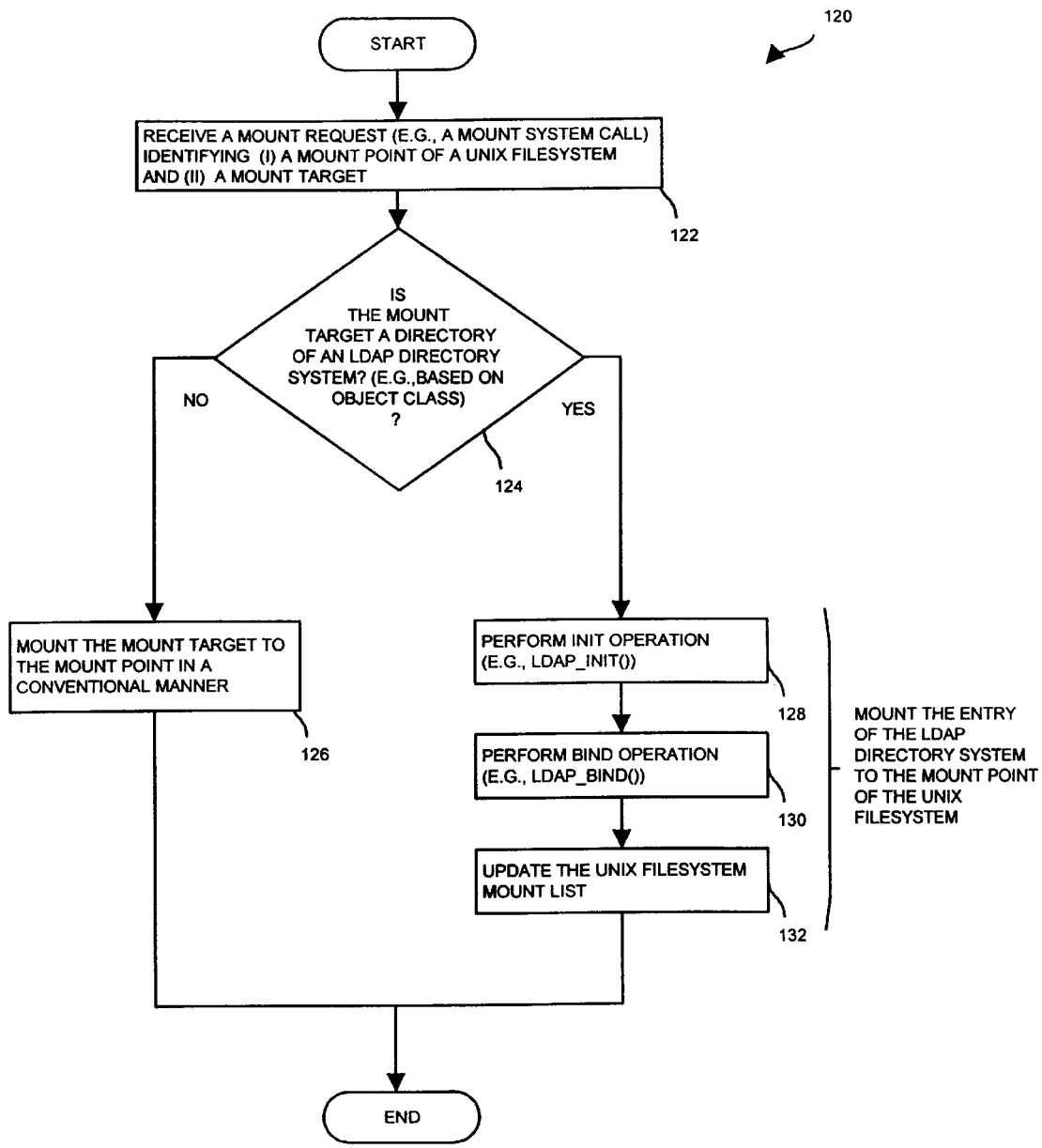
FIG. 6 is a flowchart showing a mount procedure which is suitable for use by a computer of the computer system of FIG. 3.

FIG. 6 shows a procedure 120 that is performed by the controller 111 when encountering a mount request (e.g., a mount system call). In step 122, the controller 111 receives the mount request identifying (i) a mount point of a filesystem and (ii) a mount target.

In step 124, the controller 111 determines whether the mount target is a directory entry of a directory system or a file of a filesystem. In one arrangement, the controller 111 checks an object class (or datatype) of the mount target to make this determination. If the mount target is a file of a filesystem, step 124 proceeds to step 126. If the mount target is a directory entry of a directory system, step 124 proceeds to step 128.

In step 126, the controller 111 has determined the mount target to be a file of a filesystem and mounts the file to the mount point. In particular, the controller 111 performs this mount operation in a conventional manner by establishing a mount relationship within an entry of the mount list 102 of the computer 90 (see FIG. 5), e.g., a POSIX mount( ) operation.

In steps 128 through 132, the controller 111 has determined the mount target to be a directory entry of a directory system, and mounts the directory entry to the mount point. In step 128, the controller 111 initializes an LDAP server for operation (e.g., by performing an ldap_init( ) operation). In step 130, the controller 111 preferably performs a login operation for authentication purposes (e.g., by performing an ldap_bind( ) operation). Then, in step 132, the controller 111 updates the mount list 102 of the filesystem. Accordingly, the directory system is mounted to the filesystem.

Once the controller 111 completes the procedure 120 thus mounting the directory system to the filesystem, the directory system is essentially integrated into the global name space of the filesystem from the perspective of the operating system 100. Accordingly, an interactive file-manager running on the computer 90, which shows the filesystem in an inverted tree hierarchy, will logically show (to a user) the directory entries of the directory system as files. As such, double-clicking on a directory entry (which the file-manager displays as a file) will make information within the directory entry available to the user (e.g., in LDIF format). A directory browser can also access the directory entries of the directory system but such a browser is no longer required.

With reference to FIGS. 3 through 6 and by way of example, when mounting the directory system 58-B to the filesystem 56-A (see FIG. 3), the mount point is a file called "people" of the filesystem 56-A, and the mount target is an LDAP directory entry called "ou=people" of the LDAP directory system 58-B. The application 98 running on the computer 90 (see FIG. 5) provides the controller 111 with a mount request (step 122). The determining module 114 determines that the mount target of the request is an LDAP directory entry (step 124), and provides the signal 116 indicating that the mount target is an LDAP directory entry.

Based on the signal 116, the operation performing module 118 then initializes an LDAP server (e.g., part of the operating system 100), binds the LDAP directory entry, and mounts the mount target (the directory entry called "ou=people") to the mount point (steps 128 through 132). Upon completion of the mount operation, the filesystem 56-A and the directory system 58-B form the data storage system 70, which is logically illustrated in FIGS. 4 and 3.

Figure 7:
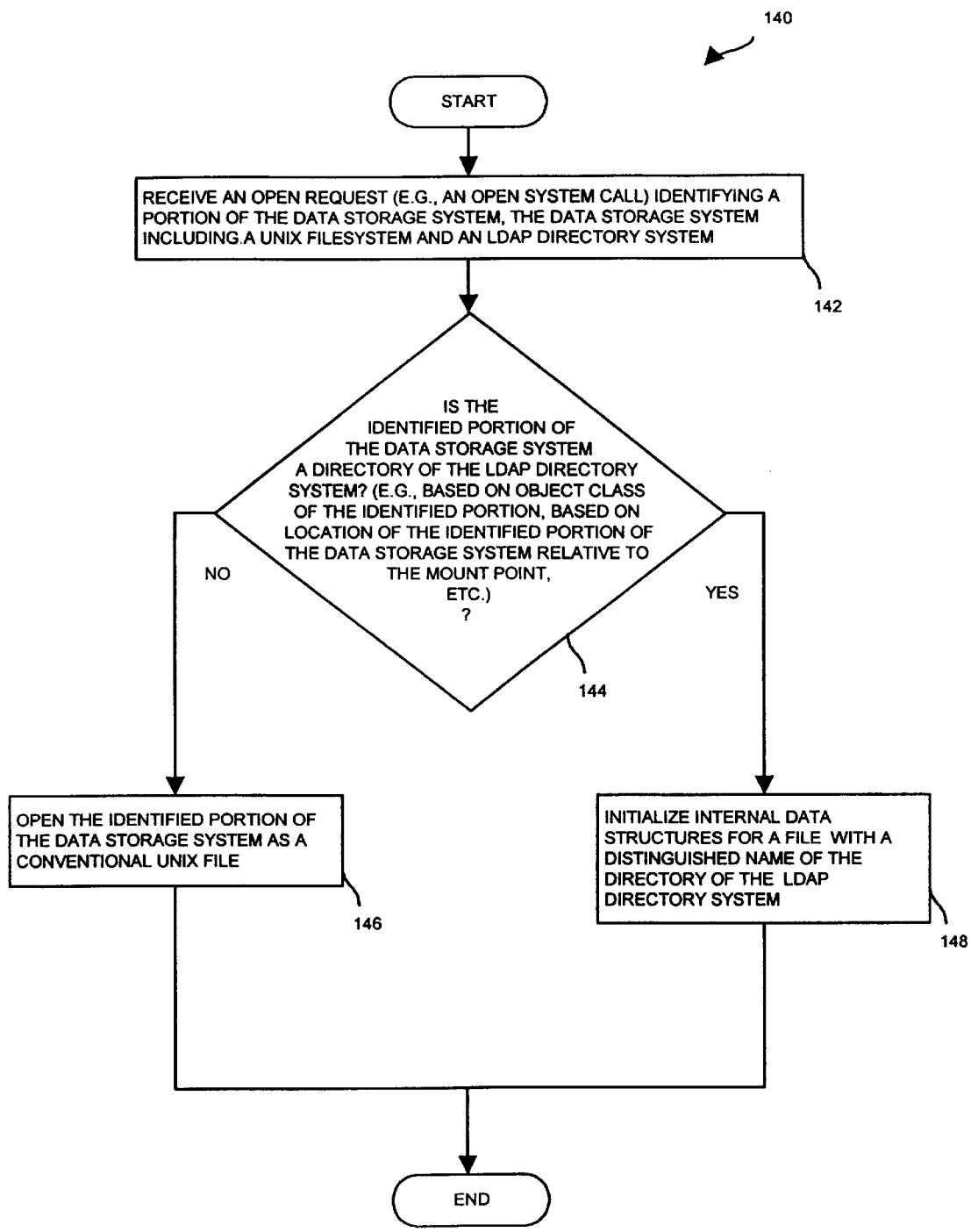
FIG. 7 is a flowchart showing an open procedure which is suitable for use by a computer of the computer system of FIG. 3.

FIG. 7 shows a procedure 140 which is performed by the controller 111 when 10 encountering an open request (e.g., an open( ) system call). In step 142, the controller 111 receives the open request which identifies a portion of the data storage system 70 including the UNIX filesystem 56-A and LDAP directory system 58-B.

In step 144, the controller 111 determines whether the identified portion of the data storage system 70 is a UNIX file or an LDAP directory entry. If the identified portion is a UNIX file, step 144 proceeds to step 146. If the identified portion is an LDAP directory entry, step 144 proceeds to step 148.

In step 146, the identified portion is a UNIX file and the controller 111 opens the UNIX file in a conventional manner (e.g., a POSIX open( ) operation). In particular, the controller 111, among other things, retrieves a file descriptor for identifying the file.

In step 148, the identified portion is an LDAP directory entry and the controller 111 performs an LDAP open operation. In particular, the controller 111 initializes internal data structures for a file with a distinguished name of the directory entry of the directory system (e.g., "ou=people", see FIGS. 3 and 4). Accordingly, the controller 111 has now opened the directory entry of the directory system for access by an application.

Figure 8:
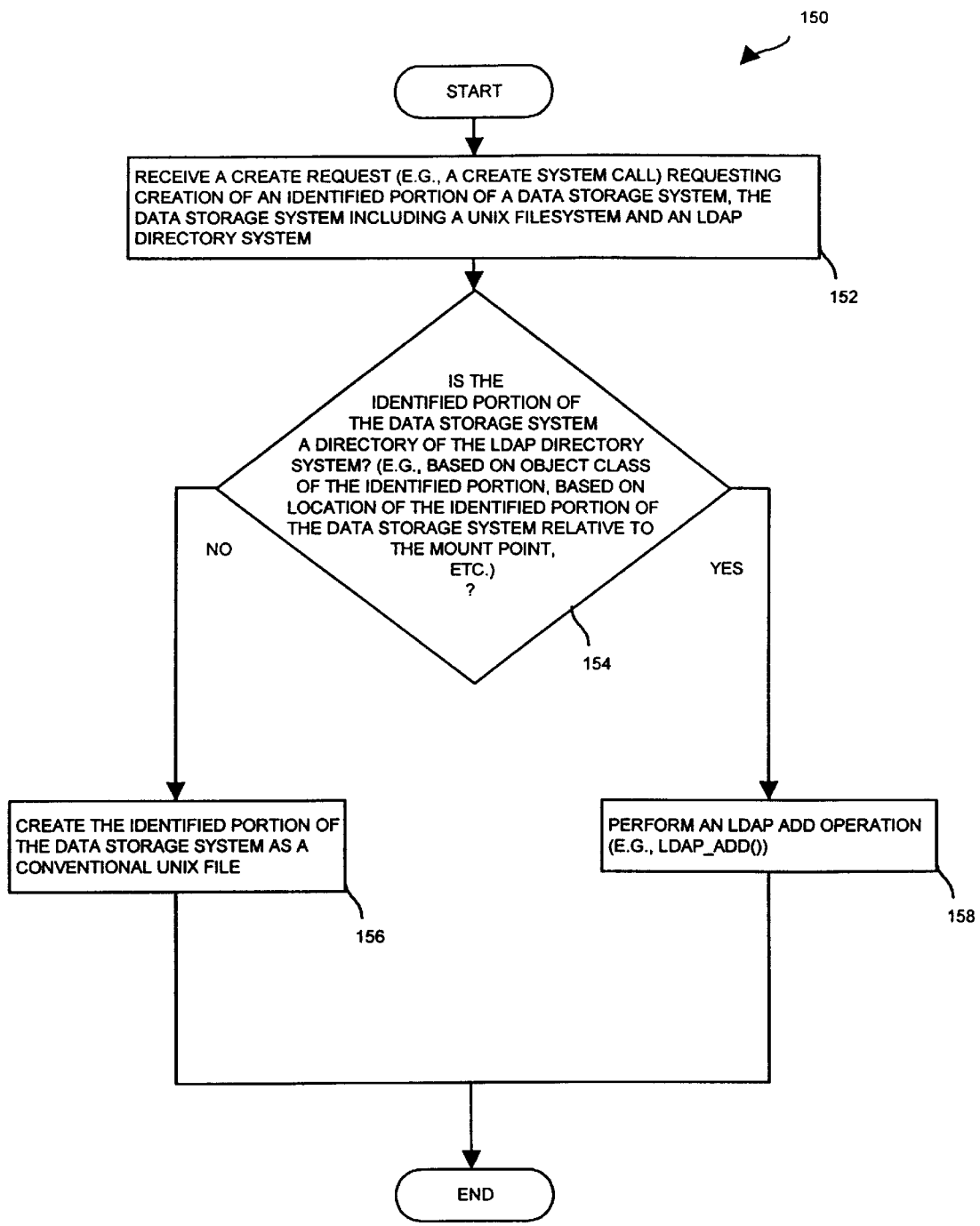
FIG. 8 is a flowchart showing a create procedure which is suitable for use by a computer of the computer system of FIG. 3.

FIG. 8 shows a procedure 150 which is performed by the controller 111 when encountering a create request (e.g., a creates system call). In step 152, the controller 111 receives the create request which identifies a portion of the data storage system 70 that includes the UNIX filesystem 56-A and LDAP directory system 58-B.

In step 154, the controller 111 determines whether the identified portion of the data storage system 70 is a UNIX file or an LDAP directory entry. If the identified portion is a UNIX file, step 154 proceeds to step 156. On the other hand, if the identified portion is an LDAP directory entry, step 154 proceeds to step 158.

In step 156, the identified portion is a UNIX file and the controller 111 creates the UNIX file in a conventional manner (e.g., a POSIX creates operation).

In step 158, the identified portion is an LDAP directory entry and the controller 111 performs an LDAP add operation. In particular, the controller 111 adds an entry to the LDAP directory system of the data storage system 70. The controller 111 distinguishes the entry from other entries by providing a unique attribute for the entry. Accordingly, the controller 111 has now added a directory entry to the directory system.

Figure 9:
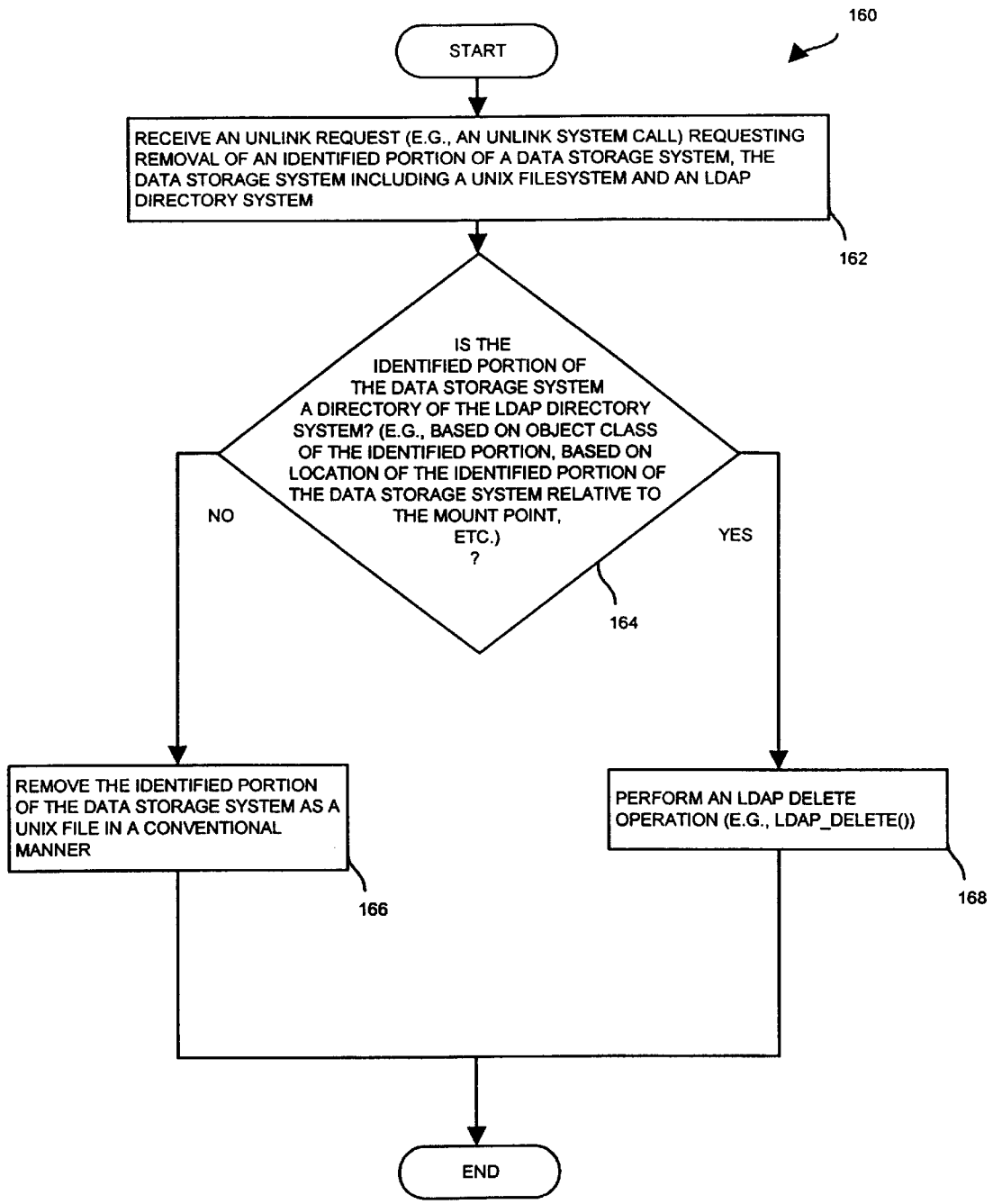
FIG. 9 is a flowchart showing an unlink procedure which is suitable for use by a computer of the computer system of FIG. 3.

FIG. 9 shows a procedure 160 which is performed by the controller 111 when encountering an unlink request (e.g., an unlink system call). In step 162, the controller 111 receives the unlink request identifying a portion of the data storage system 70 which includes the UNIX filesystem 56-A and LDAP directory system 58-B.

In step 164, the controller 111 determines whether the identified portion of the data storage system 70 is a UNIX file or an LDAP directory entry. If the identified portion is a UNIX file, step 164 proceeds to step 166. In contrast, if the identified portion is an LDAP directory entry, step 164 proceeds to step 168.

In step 166, the identified portion is a UNIX file and the controller 111 unlinks the UNIX file in a conventional manner. In particular, the controller 111 removes the UNIX file from the filesystem.

In step 168, the identified portion is an LDAP directory entry and the controller 111 performs an LDAP delete operation. In particular, the controller 111 deletes an existing entry to the LDAP directory system of the data storage system 70. Accordingly, the controller 111 has now removed the directory entry from the directory system.

Figure 10:
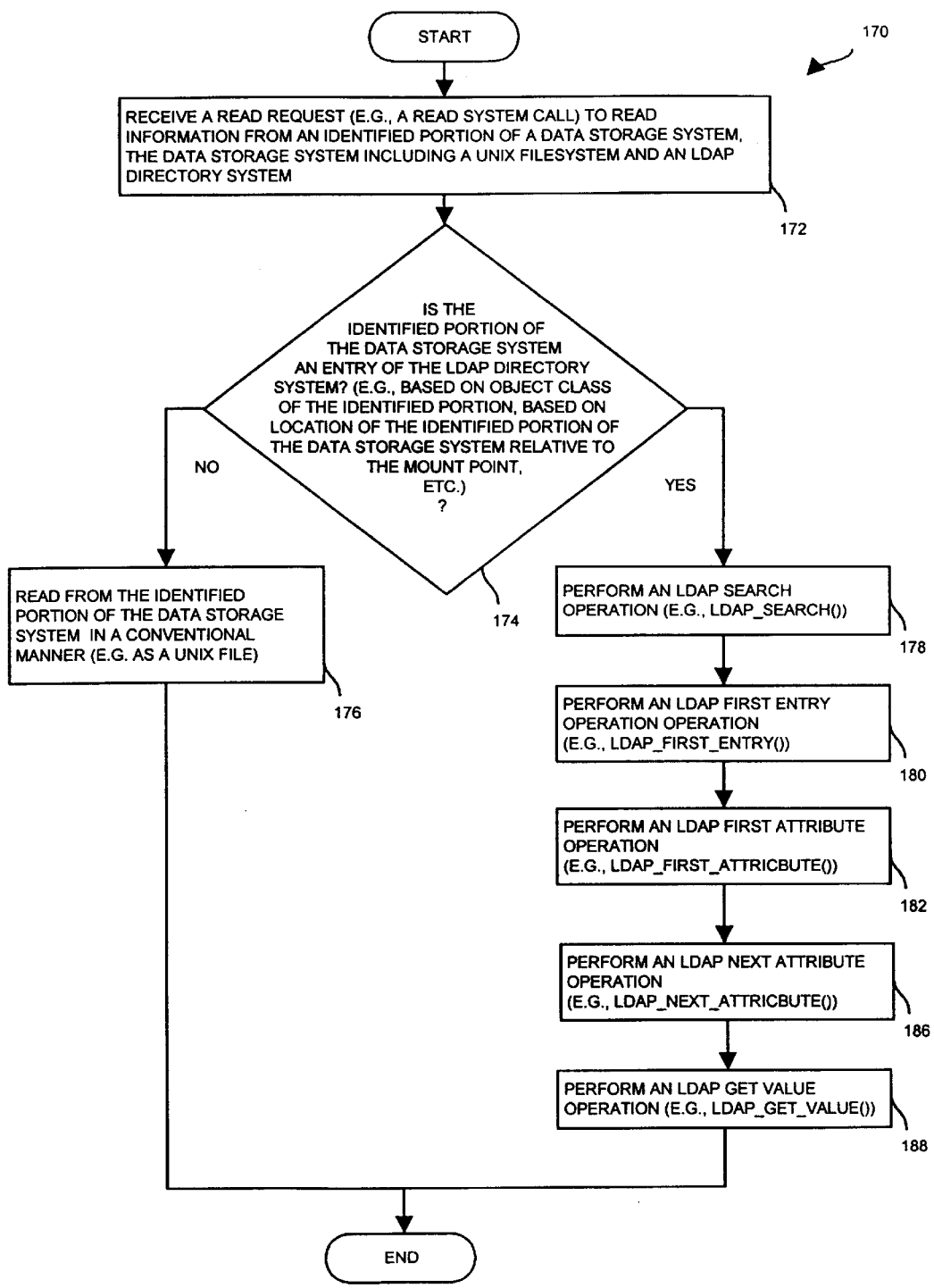
FIG. 10 is a flowchart showing a read procedure which is suitable for use by a computer of the computer system of FIG. 3.

FIG. 10 shows a procedure 170 which is performed by the controller 111 when encountering a read request (e.g., a read( ) system call). In step 172, the controller 111 receives the read request which identifies a portion of the data storage system 70 including the UNIX filesystem 56-A and LDAP directory system 58-B.

In step 174, the controller 111 determines whether the identified portion of the data storage system 70 is a UNIX file or an LDAP directory entry. If the identified portion is a UNIX file, step 174 proceeds to step 176. Otherwise, if the identified portion is an LDAP directory entry, step 174 proceeds to steps 178 through 188.

In step 176, the identified portion is a UNIX file and the controller 111 reads data from the UNIX file in a conventional manner (e.g., a POSIX read( ) operation).

In steps 178 through 188, the controller 111 reads data from the LDAP directory entry. In step 178, the controller 111 performs an LDAP search (or filter) operation to find the identified directory entry within the LDAP directory system. In step 180, the controller 111 performs an LDAP first entry operation to obtain the identifier (ID) of the LDAP directory entry (also referred to as an LDAP entry). In step 182, the controller 111 performs an LDAP first attribute operation to obtain the first attribute of the LDAP entry identified by the identifier obtained in step 180. In step 186, the controller 111 can obtain additional attributes by performing LDAP next attribute operations. In step 188, the controller 111 gets values from the identified LDAP entry. The result of performing steps 178 through 188 is data which has been extracted from an LDAP entry in a manner that is transparent to the application 98 which provided the initial read instruction to the controller 111 (i.e., no need to specify whether target is LDAP entry or UNIX file).

In one arrangement, the controller 111 checks the object class of the LDAP entry prior to reading information from the entry. If the entry has a normal object class, the reads the information in LDAP Data Interchange Format (LDIF), a popular format that describes directory entry information as text files. However, if the directory entry has a different object class (e.g., a file object class), the controller 111 can store the information in a different, non-LDIF format (e.g., store a file in the directory entry).

Figure 11:
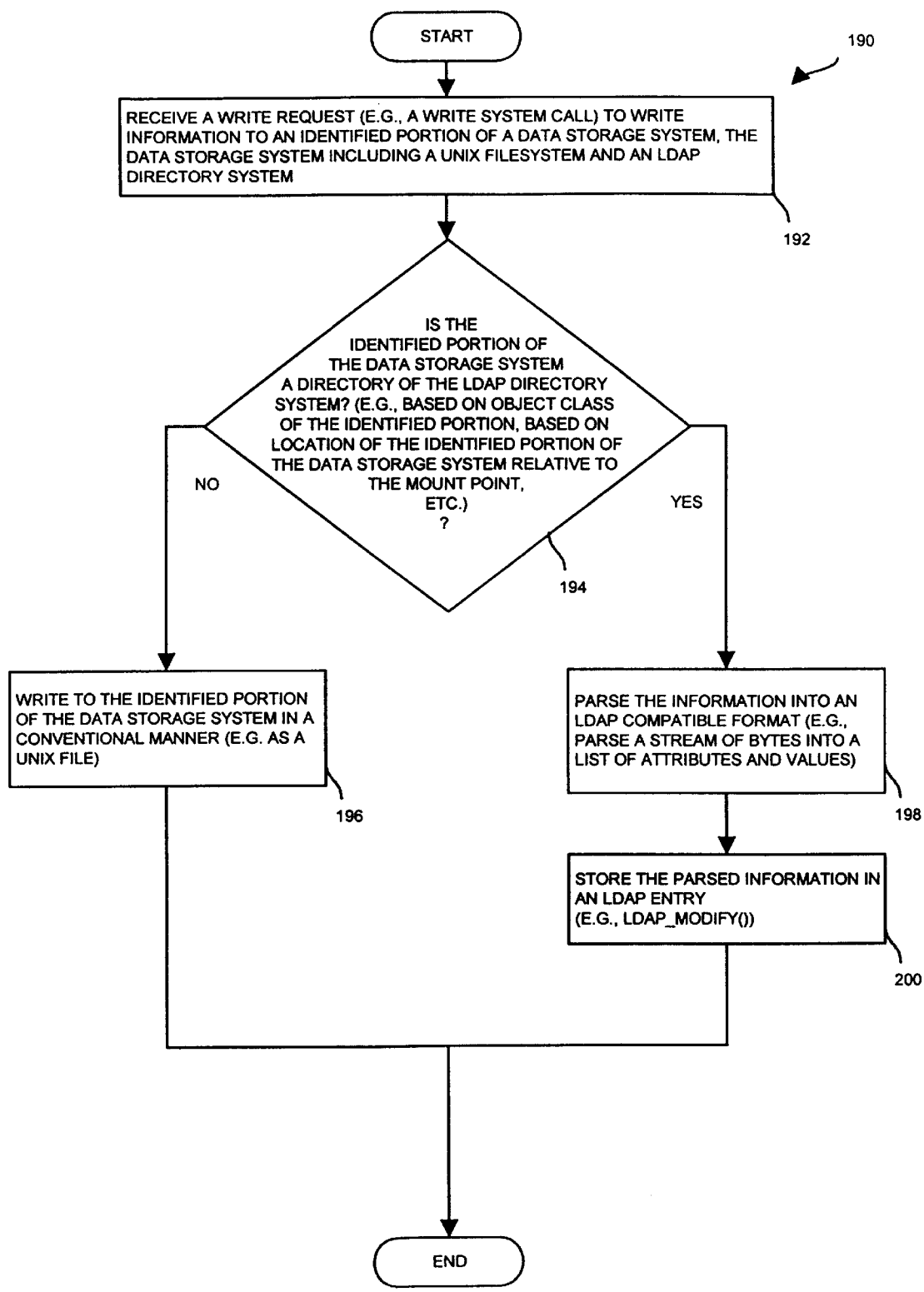
FIG. 11 is a flowchart showing a write procedure which is suitable for use by a computer of the computer system of FIG. 3.

FIG. 11 shows a procedure 190 which is performed by the controller 111 when encountering a write request (e.g., a write( ) system call). In step 192, the controller 111 receives the write request which identifies a portion of the data storage system 70 having the UNIX filesystem 56-A and LDAP directory system 58-B.

In step 194, the controller 111 determines whether the identified portion of the data storage system 70 is a UNIX file or an LDAP directory entry. If the identified portion is a UNIX file, step 194 proceeds to step 196. However, if the identified portion is an LDAP directory entry, step 194 proceeds to steps 198 through 200.

In step 196, the identified portion is a UNIX file and the controller 111 writes data to the UNIX file in a conventional manner (e.g., a POSIX write( ) operation).

In steps 198 through 200, the identified portion of the data storage system 70 is an LDAP entry. In step 198, the controller 111 parses the information into an LDAP compatible format (e.g., converts a stream of bytes into a list of attributes and values). In step 200, the controller 111 stores the parsed information in the LDAP directory entry by performing an LDAP modify operation (e.g., ldap_ modify( )). Accordingly, the controller 111 has now written information into the directory entry of the directory system.

Figure 12:
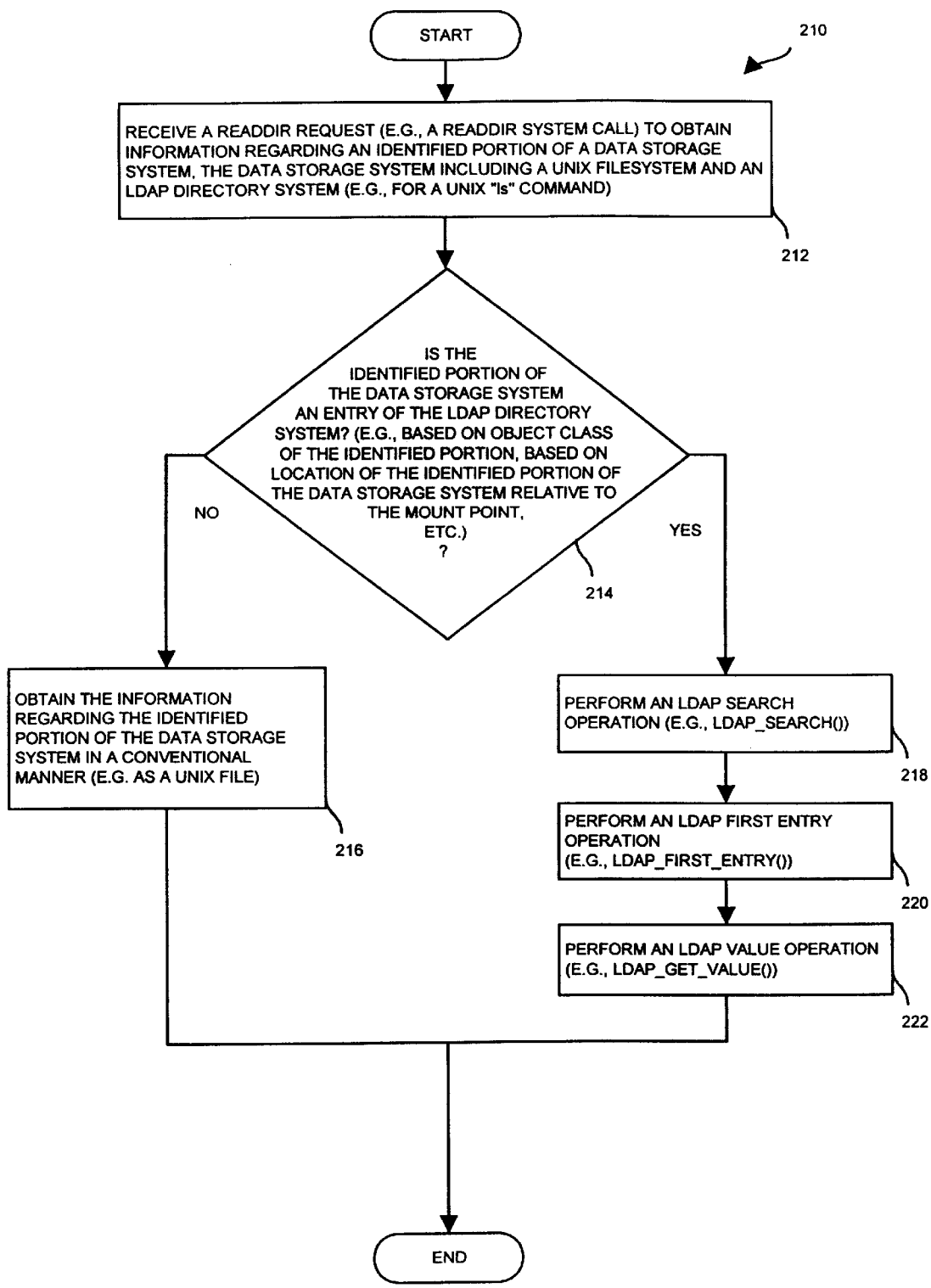
FIG. 12 is a flowchart showing a readdir procedure which is suitable for use by a computer of the computer system of FIG. 3.

FIG. 12 shows a procedure 210 which is performed by the controller 111 when encountering a readdir request (e.g., a readdir( ) system call) to obtain information regarding a particular portion of the data storage system 70 (e.g., for the UNIX "ls" command). In step 212, the controller 111 receives the readdir request which identifies the portion of the data storage system 70 having the UNIX filesystem 56-A and LDAP directory system 58-B.

In step 214, the controller 111 determines whether the identified portion of the data storage system 70 is a UNIX file or an LDAP directory entry. If the identified portion is a UNIX file, step 214 proceeds to step 216. On the other hand, if the identified portion is an LDAP directory entry, step 214 proceeds to steps 218 through 222.

In step 216, the identified portion is a UNIX file and the controller 111 obtains information regarding the UNIX file in a conventional manner (e.g., by performing low level operations for the UNIX "ls" command).

In steps 218 through 222, the identified portion of the data storage system 70 is an LDAP entry. In step 218, the controller 111 performs an LDAP search operation to find the LDAP entry within the LDAP directory system. In step 220, the controller 111 performs an LDAP first entry operation to obtain an identifier (ID) of the LDAP entry. In step 222, the controller 111 gets and returns values from the identified LDAP entry in order to satisfy the readdir request. Accordingly, the controller 111 has now obtained directory entry information of the directory system for use in navigating (e.g., for the "ls" and "cd" commands in UNIX) the data storage system as if it were exclusively a filesystem.

It should be understood that other types of requests (e.g., other system calls) can be configured to operate in manners similar to that described above for handling the more common types of access requests (e.g., open, create, read, write, etc. shown in FIGS. 6–12). By handling such requests using a file-like interface (e.g., POSIX-like), application developers can develop more portable applications (e.g., without relying on a particular LDAP API such as LDAP C, ADSI and CNS/AD). Additionally, the arrangement is well-suited for applications that access data such as network information (e.g., network configuration information and policy definitions), security and authentication data (e.g., passwords), and personnel information (e.g., names and addresses). The features of the invention may be particularly useful in computerized devices manufactured by Cisco Systems, Inc. of San Jose, Calif.

While this invention has been particularly shown and described with references to preferred embodiments thereof, it will be understood by those skilled in the art that various changes in form and details may be made therein without departing from the spirit and scope of the invention as defined by the appended claims.

For example, there is no set number of computers required for the invention. Three computer were shown in the arrangement of FIG. 3 by way of example only in order to illustrate a situation where any of the three computers will be able to access the data storage system 70 (also see FIG. 4) formed by the UNIX filesystem of the computer 52-A and the LDAP directory system 58-B of the computer 52-B. Other arrangements may include different numbers of computers. For example, another arrangement may include a single computer having both a filesystem and a directory system in a local memory (e.g., disk memory, semiconductor memory, etc.).

Additionally, it should be understood that the topology of the computer system 50 is provided by way of example only. Other topologies are suitable for use by the invention as well (e.g., token ring, hub-and-spoke, etc.).

Furthermore, it should be understood that the data storage system 70, as shown in FIG. 4, can be formed by a filesystem other than the UNIX filesystem and directory systems other than the LDAP directory system. For example, the data storage system 70 can use a Windows/NT filesystem rather than the UNIX filesystem. In such an arrangement, the procedures for responding to access requests (e.g., see FIGS. 6–12) can be configured to handle Windows/NT access operations when the identified portion of the data storage system is a Windows/NT file.

What is claimed is:

1. A computer program product that includes a computer readable medium having instructions stored thereon for accessing a data storage system which includes a filesystem and a directory system, such that the instructions, when carried out by the computer, cause the computer to perform the steps of:

obtaining an access instruction which identifies a portion of the data storage system;

determining, in response to the obtained access instruction, whether the identified portion of the data storage system is a file of the filesystem or a directory entry of the directory system, and providing a signal indicating whether the identified portion of the data storage system is a file of the filesystem or a directory entry of the directory system; and based on the signal, performing a file access operation to access the identified portion as a file when the identified portion is determined to be a file of the filesystem, and a directory entry access operation to access the identified portion as a directory entry when the identified portion is determined to be a directory entry of the directory system.

2. An apparatus, comprising:

memory that stores an application; and a controller, coupled to the memory, that operates in accordance with the application stored in the memory to access a data storage system which includes a filesystem and a directory system, wherein the controller, when operating in accordance with the application, includes:

means for obtaining an access instruction which identifies a portion of the data storage system, means for determining, in response to the obtained access instruction, whether the identified portion of the data storage system is a file of the filesystem or a directory entry of the directory system, and providing a signal indicating whether the identified portion of the data storage system is a file of the filesystem or a directory entry of the directory system, and means for based on the signal, performing a file access operation to access the identified portion as a file when the identified portion is determined to be a file of the filesystem, and a directory entry access operation to access the identified portion as a directory entry when the identified portion is determined to be a directory entry of the directory system.

3. An apparatus, comprising:

memory that stores an application; and a controller, coupled to the memory, that operates in accordance with the application stored in the memory to access a data storage system which includes a filesystem and a directory system, the application configuring the controller to perform a method comprising the steps of:

obtaining an access instruction which identifies a portion of the data storage system, determining, in response to the obtained access instruction, whether the identified portion of the data storage system is a file of the filesystem or a directory entry of the directory system, and performing a file access operation to access the identified portion as a file when the identified portion is determined to be a file of the filesystem, and a directory entry access operation to access the identified portion as a directory entry when the identified portion is determined to be a directory entry of the directory system, wherein the access instruction is a readdir command, and wherein the step of performing includes the step of:

based on a result of the step of determining, performing one of a UNIX readdir operation and a Lightweight Directory Access Protocol readdir operation to obtain information regarding the identified portion of the data storage system.

4. An apparatus, comprising:

memory that stores an application; and a controller, coupled to the memory, that operates in accordance with the application stored in the memory to access a data storage system which includes a filesystem and a directory system, the application configuring the controller to perform a method comprising the steps of:

obtaining an access instruction which identifies a portion of the data storage system, determining, in response to the obtained access instruction, whether the identified portion of the data storage system is a file of the filesystem or a directory entry of the directory system, and performing a file access operation to access the identified portion as a file when the identified portion is determined to be a file of the filesystem, and a directory entry access operation to access the identified portion as a directory entry when the identified portion is determined to be a directory entry of the directory system, wherein the access instruction is a write command, and wherein the step of performing includes the step of:

based on a result of the step of determining, performing one of a UNIX write operation and a Lightweight Directory Access Protocol write operation to write data to the identified portion of the data storage system.

5. An apparatus, comprising:

memory that stores an application; and a controller, coupled to the memory, that operates in accordance with the application stored in the memory to access a data storage system which includes a filesystem and a directory system, the application configuring the controller to perform a method comprising the steps of:
   obtaining an access instruction which identifies a portion of the data storage system,
   determining, in response to the obtained access instruction, whether the identified portion of the data storage system is a file of the filesystem or a directory entry of the directory system, and
   performing a file access operation to access the identified portion as a file when the identified portion is determined to be a file of the filesystem, and a directory entry access operation to access the identified portion as a directory entry when the identified portion is determined to be a directory entry of the directory system, wherein the access instruction is a read command, and wherein the step of performing includes the step of:
      based on a result of the step of determining, performing one of a UNIX read operation and a Lightweight Directory Access Protocol read operation to read data from the identified portion of the data storage system.

6. An apparatus, comprising:
memory that stores an application; and
a controller, coupled to the memory, that operates in accordance with the application stored in the memory to access a data storage system which includes a filesystem and a directory system, the application configuring the controller to perform a method comprising the steps of:
   obtaining an access instruction which identifies a portion of the data storage system,
   determining, in response to the obtained access instruction, whether the identified portion of the data storage system is a file of the filesystem or a directory entry of the directory system, and
   performing a file access operation to access the identified portion as a file when the identified portion is determined to be a file of the filesystem, and a directory entry access operation to access the identified portion as a directory entry when the identified portion is determined to be a directory entry of the directory system, wherein the access instruction is an unlink command, and wherein the step of performing includes the step of:
      based on a result of the step of determining, performing one of a UNIX remove operation and a Lightweight Directory Access Protocol delete operation to erase the identified portion from the data storage system.

7. An apparatus, comprising:
memory that stores an application; and
a controller, coupled to the memory, that operates in accordance with the application stored in the memory to access a data storage system which includes a filesystem and a directory system, the application configuring the controller to perform a method comprising the steps of:
   obtaining an access instruction which identifies a portion of the data storage system,
   determining, in response to the obtained access instruction, whether the identified portion of the data storage system is a file of the filesystem or a directory entry of the directory system, and
   performing a file access operation to access the identified portion as a file when the identified portion is determined to be a file of the filesystem, and a directory entry access operation to access the identified portion as a directory entry when the identified portion is determined to be a directory entry of the directory system, wherein the access instruction is a create command, and wherein the step of performing includes the step of:
      based on a result of the step of determining, performing one of a UNIX create operation and a Lightweight Directory Access Protocol create operation to create the identified portion of the data storage system.

8. An apparatus, comprising:
memory that stores an application; and
a controller, coupled to the memory, that operates in accordance with the application stored in the memory to access a data storage system which includes a filesystem and a directory system, the application configuring the controller to perform a method comprising the steps of:
   obtaining an access instruction which identifies a portion of the data storage system,
   determining, in response to the obtained access instruction, whether the identified portion of the data storage system is a file of the filesystem or a directory entry of the directory system, and
   performing a file access operation to access the identified portion as a file when the identified portion is determined to be a file of the filesystem, and a directory entry access operation to access the identified portion as a directory entry when the identified portion is determined to be a directory entry of the directory system, wherein the access instruction is an open command, and wherein the step of performing includes the step of:
      based on a result of the step of determining, performing one of a UNIX open operation and a Lightweight Directory Access Protocol open operation to open the identified portion of the data storage system.

9. An apparatus, comprising:
memory that stores an application; and
a controller, coupled to the memory, that operates in accordance with the application stored in the memory to access a data storage system which includes a filesystem and a directory system, the application configuring the controller to perform a method comprising the steps of:
   obtaining an access instruction which identifies a portion of the data storage system,
   determining, in response to the obtained access instruction, whether the identified portion of the data storage system is a file of the filesystem or a directory entry of the directory system, and
   performing a file access operation to access the identified portion as a file when the identified portion is determined to be a file of the filesystem, and a directory entry access operation to access the identified portion as a directory entry when the identified portion is determined to be a directory entry of the directory system, wherein the filesystem is a UNIX filesystem, wherein the directory system is a Lightweight Directory Access Protocol directory system, and wherein the step of performing includes the step of:
      accessing the identified portion of the data storage system as a UNIX file when the identified portion is determined to be a file of the filesystem, and a Lightweight Directory Access Protocol directory entry when the identified portion is determined to be a directory entry of the directory system.

10. An apparatus, comprising:
memory that stores an application; and
a controller, coupled to the memory, that operates in accordance with the application stored in the memory to access a data storage system which includes a filesystem and a directory system, the application configuring the controller to perform a method comprising the steps of:
  obtaining an access instruction which identifies a portion of the data storage system,
  determining, in response to the obtained access instruction, whether the identified portion of the data storage system is a file of the filesystem or a directory entry of the directory system, and
  performing a file access operation to access the identified portion as a file when the identified portion is determined to be a file of the filesystem, and a directory entry access operation to access the identified portion as a directory entry when the identified portion is determined to be a directory entry of the directory system, wherein the filesystem is a UNIX filesystem, wherein the directory system is a Lightweight Directory Access Protocol directory system, and wherein the method further includes the step of:
    prior to the step of performing, mounting a directory entry of the Lightweight Directory Access Protocol directory system to a mount point of the UNIX filesystem in order to couple the Lightweight Directory Access Protocol directory system to the UNIX filesystem.

11. The apparatus of claim 10 wherein the step of determining includes the step of:
  ascertaining a location of the identified portion of the data storage system relative to the mount point of the UNIX filesystem to determine whether the identified portion of the data storage system is a file of the filesystem or a directory entry of the directory system.

12. An apparatus, comprising:
memory that stores an application; and
a controller, coupled to the memory, that operates in accordance with the application stored in the memory to access a data storage system which includes a filesystem and a directory system, the application configuring the controller to perform a method comprising the steps of:
  obtaining an access instruction which identifies a portion of the data storage system,
  determining, in response to the obtained access instruction, whether the identified portion of the data storage system is a file of the filesystem or a directory entry of the directory system, and providing a signal indicating whether the identified portion of the data storage system is a file of the filesystem or a directory entry of the directory system, and
  based on the signal, performing a file access operation to access the identified portion as a file when the identified portion is determined to be a file of the filesystem, and a directory entry access operation to access the identified portion as a directory entry when the identified portion is determined to be a directory entry of the directory system.

13. The apparatus of claim 12 wherein each file of the filesystem belongs to a file object class, wherein each directory entry of the directory system belongs to a directory entry object class, and wherein the step of determining includes the step of:
  deciding whether the identified portion of the data storage system belongs to the file object class or the directory entry object class to determine whether the identified portion of the data storage system is a file of the filesystem or a directory entry of the directory system.

14. A method for accessing a data storage system which includes a filesystem and a directory system, the method comprising the steps of:
  obtaining an access instruction which identifies a portion of the data storage system;
  determining, in response to the obtained access instruction, whether the identified portion of the data storage system is a file of the filesystem or a directory entry of the directory system; and
  performing a file access operation to access the identified portion as a file when the identified portion is determined to be a file of the filesystem, and a directory entry access operation to access the identified portion as a directory entry when the identified portion is determined to be a directory entry of the directory system, wherein the access instruction is a readdir command, and wherein the step of performing includes the step of:
    based on a result of the step of determining, performing one of a UNIX readdir operation and a Lightweight Directory Access Protocol readdir operation to obtain information regarding the identified portion of the data storage system.

15. A method for accessing a data storage system which includes a filesystem and a directory system, the method comprising the steps of:
  obtaining an access instruction which identifies a portion of the data storage system;
  determining, in response to the obtained access instruction, whether the identified portion of the data storage system is a file of the filesystem or a directory entry of the directory system; and
  performing a file access operation to access the identified portion as a file when the identified portion is determined to be a file of the filesystem, and a directory entry access operation to access the identified portion as a directory entry when the identified portion is determined to be a directory entry of the directory system, wherein the access instruction is a write command, and wherein the step of performing includes the step of:
    based on a result of the step of determining, performing one of a UNIX write operation and a Lightweight Directory Access Protocol write operation to write data to the identified portion of the data storage system.

16. A method for accessing a data storage system which includes a filesystem and a directory system, the method comprising the steps of:
  obtaining an access instruction which identifies a portion of the data storage system;
  determining, in response to the obtained access instruction, whether the identified portion of the data storage system is a file of the filesystem or a directory entry of the directory system; and
  performing a file access operation to access the identified portion as a file when the identified portion is determined to be a file of the filesystem, and a directory entry access operation to access the identified portion as a directory entry when the identified portion is determined to be a directory entry of the directory system, wherein the access instruction is a read command, and wherein the step of performing includes the step of:

based on a result of the step of determining, performing one of a UNIX read operation and a Lightweight Directory Access Protocol read operation to read data from the identified portion of the data storage system.

17. A method for accessing a data storage system which includes a filesystem and a directory system, the method comprising the steps of:

obtaining an access instruction which identifies a portion of the data storage system;

determining, in response to the obtained access instruction, whether the identified portion of the data storage system is a file of the filesystem or a directory entry of the directory system; and performing a file access operation to access the identified portion as a file when the identified portion is determined to be a file of the filesystem, and a directory entry access operation to access the identified portion as a directory entry when the identified portion is determined to be a directory entry of the directory system, wherein the access instruction is an unlink command, and wherein the step of performing includes the step of:

based on a result of the step of determining, performing one of a UNIX remove operation and a Lightweight Directory Access Protocol delete operation to erase the identified portion from the data storage system.

18. A method for accessing a data storage system which includes a filesystem and a directory system, the method comprising the steps of:

obtaining an access instruction which identifies a portion of the data storage system;

determining, in response to the obtained access instruction, whether the identified portion of the data storage system is a file of the filesystem or a directory entry of the directory system; and performing a file access operation to access the identified portion as a file when the identified portion is determined to be a file of the filesystem, and a directory entry access operation to access the identified portion as a directory entry when the identified portion is determined to be a directory entry of the directory system, wherein the access instruction is a create command, and wherein the step of performing includes the step of:

based on a result of the step of determining, performing one of a UNIX create operation and a Lightweight Directory Access Protocol create operation to create the identified portion of the data storage system.

19. A method for accessing a data storage system which includes a filesystem and a directory system, the method comprising the steps of:

obtaining an access instruction which identifies a portion of the data storage system;

determining, in response to the obtained access instruction, whether the identified portion of the data storage system is a file of the filesystem or a directory entry of the directory system; and performing a file access operation to access the identified portion as a file when the identified portion is determined to be a file of the filesystem, and a directory entry access operation to access the identified portion as a directory entry when the identified portion is determined to be a directory entry of the directory system, wherein the access instruction is an open command, and wherein the step of performing includes the step of:

based on a result of the step of determining, performing one of a UNIX open operation and a Lightweight Directory Access Protocol open operation to open the identified portion of the data storage system.

20. A method for accessing a data storage system which includes a filesystem and a directory system, the method comprising the steps of:

obtaining an access instruction which identifies a portion of the data storage system;

determining, in response to the obtained access instruction, whether the identified portion of the data storage system is a file of the filesystem or a directory entry of the directory system; and performing a file access operation to access the identified portion as a file when the identified portion is determined to be a file of the filesystem, and a directory entry access operation to access the identified portion as a directory entry when the identified portion is determined to be a directory entry of the directory system, wherein the filesystem is a UNIX filesystem, wherein the directory system is a Lightweight Directory Access Protocol directory system, and wherein the step of performing includes the step of:

accessing the identified portion of the data storage system as a UNIX file when the identified portion is determined to be a file of the filesystem, and a Lightweight Directory Access Protocol directory entry when the identified portion is determined to be a directory entry of the directory system.

21. A method for accessing a data storage system which includes a filesystem and a directory system, the method comprising the steps of:

obtaining an access instruction which identifies a portion of the data storage system;

determining, in response to the obtained access instruction, whether the identified portion of the data storage system is a file of the filesystem or a directory entry of the directory system; and performing a file access operation to access the identified portion as a file when the identified portion is determined to be a file of the filesystem, and a directory entry access operation to access the identified portion as a directory entry when the identified portion is determined to be a directory entry of the directory system, wherein the filesystem is a UNIX filesystem, wherein the directory system is a Lightweight Directory Access Protocol directory system, and wherein the method further comprises the step of:

prior to the step of performing, mounting a directory entry of the Lightweight Directory Access Protocol directory system to a mount point of the UNIX filesystem in order to couple the Lightweight Directory Access Protocol directory system to the UNIX filesystem.

22. The method of claim 21 wherein the step of determining includes the step of:

ascertaining a location of the identified portion of the data storage system relative to the mount point of the UNIX filesystem to determine whether the identified portion of the data storage system is a file of the filesystem or a directory entry of the directory system.

23. A method for accessing a data storage system which includes a filesystem and a directory system, the method comprising the steps of:

obtaining an access instruction which identifies a portion of the data storage system;

determining, in response to the obtained access instruction, whether the identified portion of the data storage system is a file of the filesystem or a directory entry of the directory system, and providing a signal indicating whether the identified portion of the data storage system is a file of the filesystem or a directory entry of the directory system; and based on the signal, performing a file access operation to access the identified portion as a file when the identified portion is determined to be a file of the filesystem, and a directory entry access operation to access the identified portion as a directory entry when the identified portion is determined to be a directory entry of the directory system.

24. The method of claim 1 wherein each file of the filesystem belongs to a file object class, wherein each directory entry of the directory system belongs to a directory entry object class, and wherein the step of determining includes the step of:

deciding whether the identified portion of the data storage system belongs to the file object class or the directory entry object class to determine whether the identified portion of the data storage system is a file of the filesystem or a directory entry of the directory system.

* * * * *